(12) United States Patent
Park

(10) Patent No.: US 11,979,043 B2
(45) Date of Patent: May 7, 2024

(54) BATTERY SYSTEM WITH FUNCTION OF PREVENTING ABNORMAL VOLTAGE AT OUTPUT STAGE AND CONTROL METHOD THEREOF

(71) Applicant: HYUNDAI MOBIS Co., Ltd., Seoul (KR)

(72) Inventor: Ho Young Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 377 days.

(21) Appl. No.: 17/383,072

(22) Filed: Jul. 22, 2021

(65) Prior Publication Data

US 2022/0029441 A1    Jan. 27, 2022

(30) Foreign Application Priority Data

Jul. 22, 2020    (KR) .................. 10-2020-0091144

(51) Int. Cl.
*H02J 7/00*    (2006.01)

(52) U.S. Cl.
CPC ........ *H02J 7/00308* (2020.01); *H02J 7/0048* (2020.01)

(58) Field of Classification Search
USPC ........................................................ 320/136
See application file for complete search history.

(56) References Cited

U.S. PATENT DOCUMENTS

| | | | |
|---|---|---|---|
| 2016/0156205 A1* | 6/2016 | Lee ..................... | H01M 10/482 320/112 |
| 2017/0149101 A1* | 5/2017 | Sakabe ................ | H01M 10/48 |
| 2020/0412155 A1* | 12/2020 | Choi ................. | H02J 7/007182 |
| 2021/0237670 A1* | 8/2021 | Takahara ............. | H02J 7/0063 |

* cited by examiner

*Primary Examiner* — Samuel Berhanu
(74) *Attorney, Agent, or Firm* — Morgan, Lewis & Bockius LLP

(57) ABSTRACT

A system for preventing an abnormal voltage of a battery at an output stage includes a battery management system (BMS), which includes: a plurality of voltage sensors configured to detect first voltages of a plurality of battery cells; an automatic cut-off switch configured to cut off power applied from the plurality of battery cells according to a first control signal from the BMS; a high-voltage interlock switch connected to the automatic cut-off switch and configured to operate at a second voltage that is a preset voltage or more; an active voltage switch configured to operate at a third voltage transmitted through the automatic shut-off switch to control the relay switch; and a controller configured to, in response to detecting a voltage, which is higher than a threshold voltage, among the first voltages by the voltage sensor, provide a cut-off control signal to the relay switch.

7 Claims, 5 Drawing Sheets

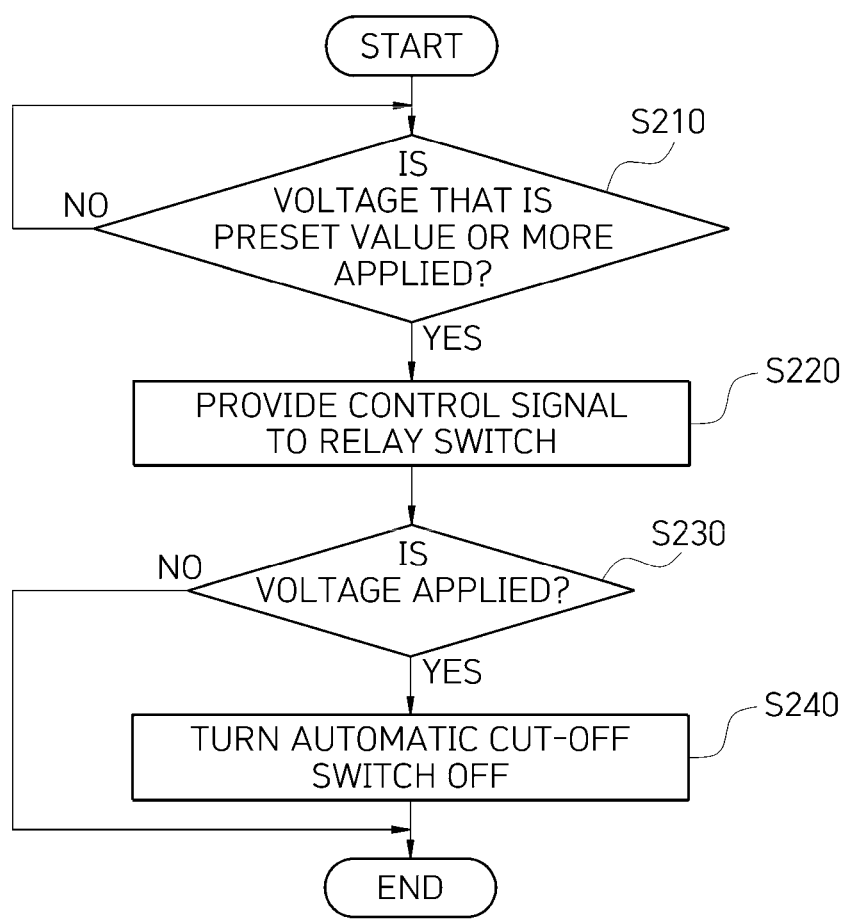

BATTERY SYSTEM WITH FUNCTION OF PREVENTING ABNORMAL VOLTAGE AT OUTPUT STAGE AND CONTROL METHOD THEREOF

CROSS-REFERENCE TO RELATED APPLICATION

This application claims priority to and the benefit of Korean Patent Application No. 10-2020-0091144, filed on Jul. 22, 2020, the disclosure of which is incorporated herein by reference in its entirety.

BACKGROUND

1. Field of the Disclosure

The present disclosure relates to a battery system with a function of preventing an abnormal voltage at an output stage, and more particularly, to a battery system with a function of preventing an abnormal voltage at an output stage, which is capable of preventing occurrence of an abnormal voltage at an output stage to protect the output stage when a battery cell of a vehicle battery system is short-circuited.

2. Discussion of Related Art

As shown in FIG. 1, when a battery short circuit occurs in the existing battery system, a method of disconnecting a closed-circuit connection employs a mechanical method of breaking an internal high-voltage fuse provided between battery cells to cut off a connection in a battery.

Alternatively, there is a method in which a battery management system (BMS) managing a battery system controls an external relay switch to electrically deactivate an output stage of a battery cell.

To this end, as shown in FIG. 2, the existing BMS 10 includes a voltage sensor 11 for detecting whether a voltage applied from a battery cell 20 is a predetermined voltage or more, a central processing unit (CPU) 12 that provides a control signal to a relay switch 40 to cut off a voltage applied from the battery cell 20 when a voltage value detected by the voltage sensor 11 is a preset value or more, and an OPD IC (13) that operates when a high voltage is applied from the battery cell 20 and turns the relay switch 40 off through a high switch 14.

That is, when application of an overvoltage applied from the battery cell 20 is detected through the voltage sensor 11, the CPU 12 in the BMS 10 outputs a control signal and transmits the control signal to the relay switch 40 to cut off a connection with the battery cell 20.

In addition, there is another method in which, when a voltage that is a preset value or more is applied inside the BMS 10 in a state in which the CPU 12 in the BMS 10 fails, the OPD IC 13 operates to turn the external relay switch 40 off through the high switch 14, thereby electrically deactivating an output stage of the battery cell 20.

However, in the existing battery system that blocks the relay switch by a fuse disconnection or CPU control, when a high external current is applied even when the relay switch is blocked by the CPU, an unexpected non-ideal closed circuit (closed loop) is formed in an internal circuit of the BMS, and thus there is a problem in that a phenomenon in which a battery output voltage is activated occurs.

SUMMARY OF THE DISCLOSURE

The present disclosure is directed to solving the above problems and providing a battery system with a function of preventing an abnormal voltage at an output stage, which is capable of controlling to prevent a closed loop from being generated in a battery management system (BMS) due to a failure of the BMS and the nature of a battery system in which power and protection circuits of electronic components are increased and is capable of preventing an output stage of a battery cell from being electrically activated in advance.

It should be noted that objectives of the present disclosure are not limited to the above-described objectives, and other objectives of the present disclosure will be apparent to those skilled in the art from the following descriptions.

According to an aspect of the present disclosure, there is provided a battery system for preventing an abnormal voltage at an output stage, which includes a battery management system (BMS) including: a plurality of voltage sensors configured to detect first voltages of a plurality of battery cells, respectively; a relay switch configured to apply the first voltages to an electrical device according to a first control signal from the BMS; an automatic cut-off switch configured to cut off power applied from the plurality of battery cells according to a second control signal from the BMS, a high-voltage interlock switch connected to the automatic cut-off switch and configured to operate at a second voltage that is a preset voltage or more; an active voltage switch configured to operate at a third voltage transmitted through the automatic shut-off switch to control the relay switch, and a controller configured to, in response to detecting a voltage, which is higher than a threshold voltage, among the first voltages by the voltage sensor, provide a cut-off control signal to the relay switch.

When the relay switch does not perform cutting off in response to receiving the cut-off control signal from the controller, the controller may output a third control signal to the automatic cut-off switch to turn the relay switch off through the active voltage switch.

When the third control signal is output to turn the relay switch off and activation of the output stage of the plurality of battery cells is detected through the voltage sensor, the controller may provide a fourth control signal to the automatic cut-off switch so as to turn the automatic cut-off switch off.

According to another aspect of the present disclosure, there is provided a method of controlling a battery system for preventing an abnormal voltage at an output stage, which includes: determining whether a voltage, which is a preset voltage or more is applied from a battery cell; upon determining that the voltage applied from the battery cell is the present voltage or more, determining, by a controller of a battery management system (BMS), whether a relay switch is controllable; upon determining that the relay switch is not controllable, switching, by the controller, an automatic cut-off switch to be turned on to apply the voltage applied from the battery cell to an active voltage switch and a high-voltage interlock switch; and upon determining that the voltage applied from the battery cell is or less than the preset voltage, driving the active voltage switch to turn off the relay switch.

The control method may further include, upon determining that the voltage applied from the battery cell exceeds the preset voltage, operating the high-voltage interlock switch that operates only at the preset voltage or more to control the relay switch to be turned off.

The control method further include, upon determining that the relay switch is controllable through the controller, directly controlling, by the controller, the relay switch to be turned off.

According to still another aspect of the present disclosure, there is provided a method of controlling a battery system for preventing an abnormal voltage at an output stage, which includes: detecting, by a controller in a battery system, whether a voltage, which is a preset value or more, is applied from a battery cell through a voltage sensor; upon detecting that the voltage is the preset voltage value or more, providing, by the controller, a first control signal to a relay switch, which is externally connected to the battery system, to block a connection between the relay switch and the battery cell; in a state in which the connection between the relay switch and the battery cell is controlled to be blocked, detecting whether the voltage is applied from the battery cell through the voltage sensor; and upon detecting that the voltage applied from the battery cell, outputting a second control signal for blocking a connection to an automatic cut-off switch of a battery management system (BMS) that is connected to the electric battery so as to cut off the voltage applied from the electric battery.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 5 is a flowchart for describing a control method of a battery system with a function of preventing an abnormal voltage at an output stage according to one embodiment of the present disclosure.

DETAILED DESCRIPTION OF EXEMPLARY EMBODIMENTS

Advantages, features, and implementations thereof will be apparent from embodiments which are described in detail below together with the accompanying drawings. The present disclosure may, however, be implemented in many different forms and should not be construed as being limited to the embodiments set forth herein, and the embodiments are provided such that this disclosure will be thorough and complete and will fully convey the scope of the present disclosure to those skilled in the art to which the present disclosure pertains, and the present disclosure is defined by only the scope of the appended claims. Meanwhile, terms used herein are for the purpose of describing the embodiments and are not intended to limit the present disclosure. As used herein, the singular forms include the plural forms as well unless the context clearly indicates otherwise. It is noted that the terms "comprises" and/or "comprising" used herein do not exclude the presence or addition of one or more other components, steps, operations, and/or elements in addition to stated components, steps, operations, and/or elements.

Figure 1:
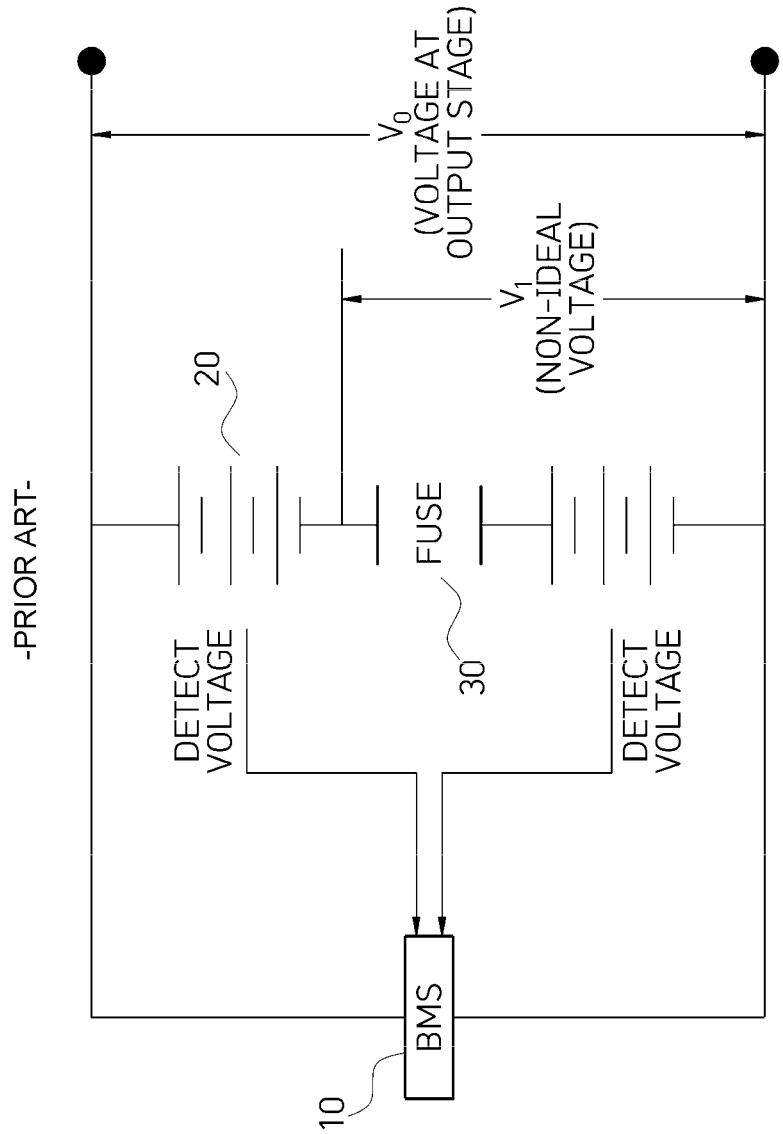
FIG. 1 is a functional block diagram illustrating an existing battery system.
Figure 2:
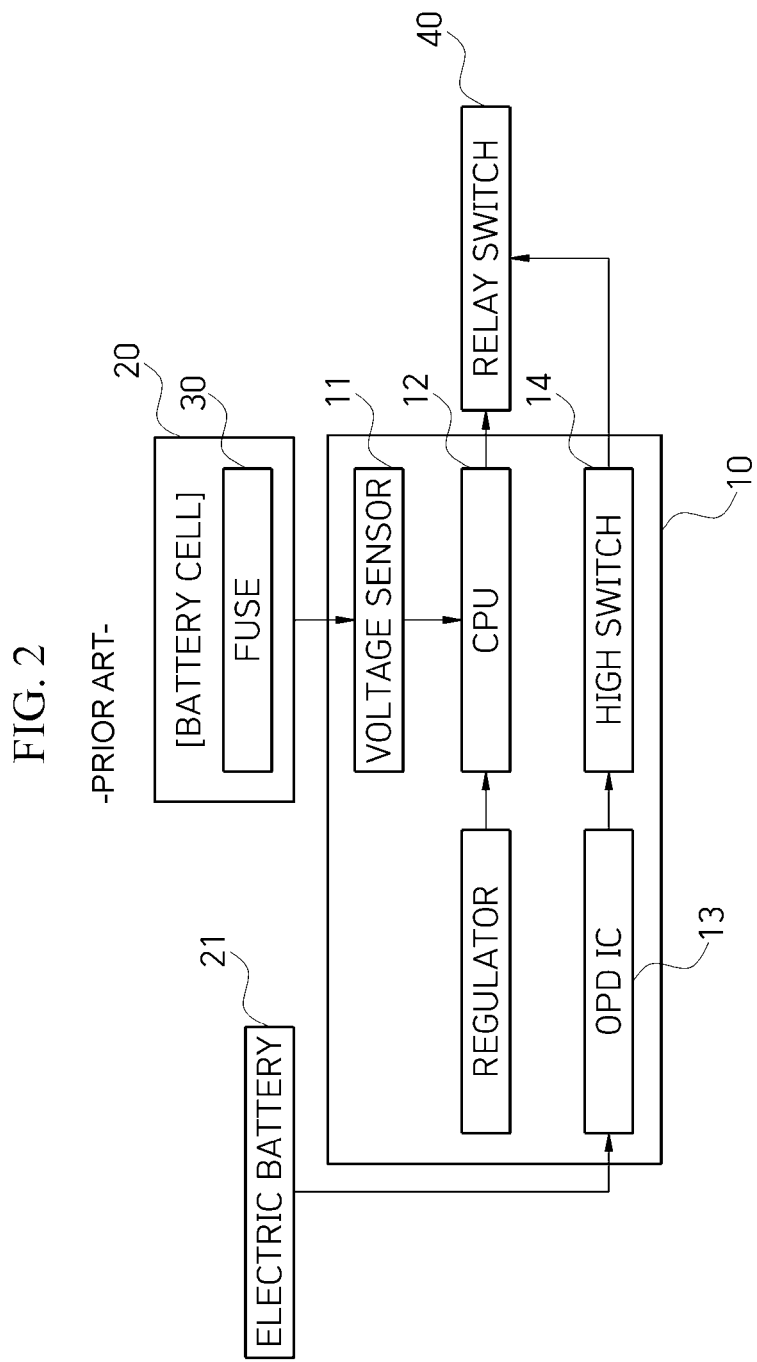
FIG. 2 is a functional block diagram for describing a detailed configuration of a battery management system (BMS) of FIG. 1.
Figure 3:
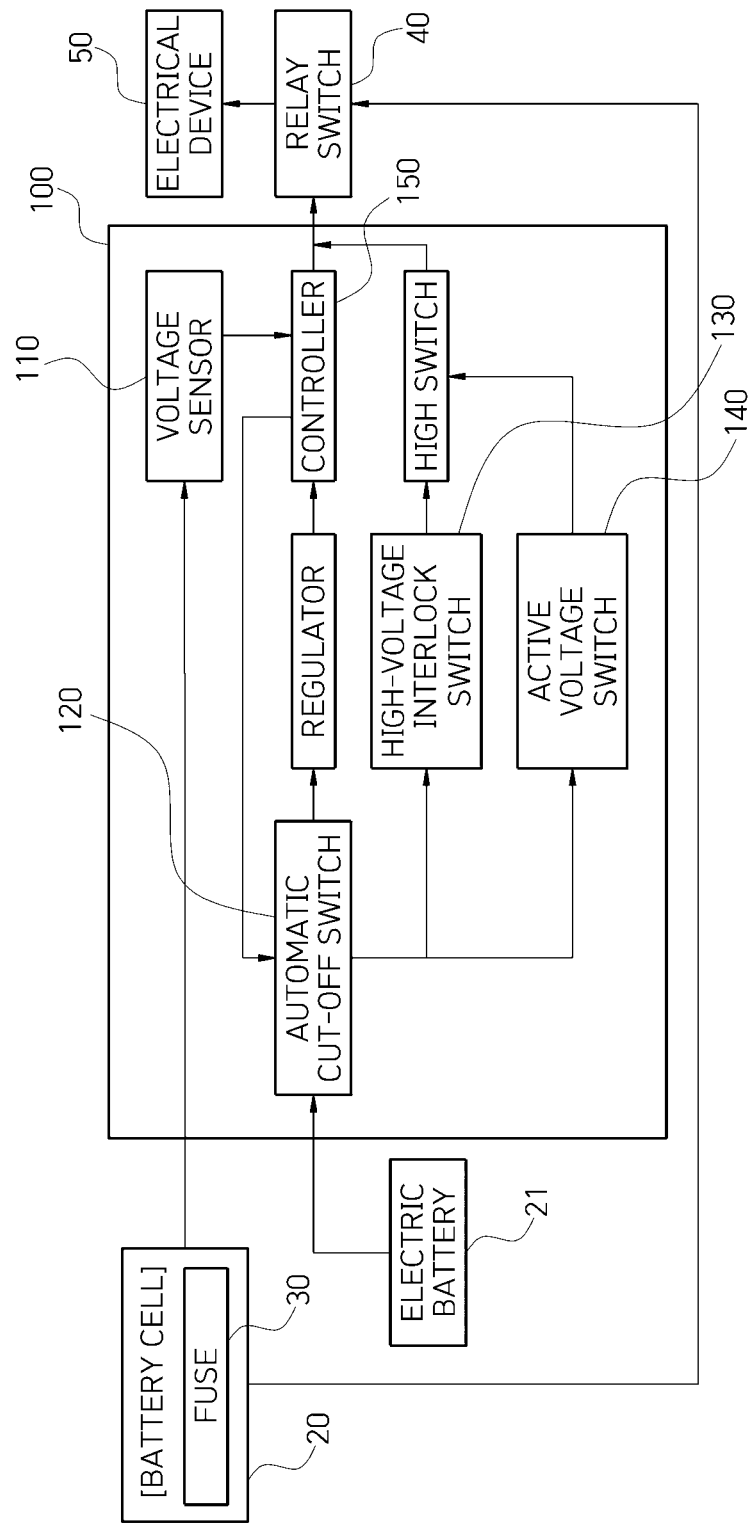
FIG. 3 is a functional block diagram for describing a battery system with a function of preventing an abnormal voltage at an output stage according to one embodiment of the present disclosure.

FIG. 3 is a functional block diagram for describing a battery system with a function of preventing an abnormal voltage at an output stage according to one embodiment of the present disclosure.

As shown in FIG. 3, the battery system with a function of preventing an abnormal voltage at an output stage according to one embodiment of the present disclosure includes a voltage sensor 110, an automatic cut-off switch 120, a high-voltage interlock switch 130, an active voltage switch 140, and a controller 150.

A plurality of voltage sensors 110 detect voltages of a plurality of battery cells 20.

When the voltage sensor 110 detects a voltage output of the battery cell 20 after the controller 150 outputs a control signal for turning a relay switch 40 off, the automatic cut-off switch 120 cuts off power applied from an electric battery 21 according to a control signal output from the controller 150. A switching element may be used as the automatic cut-off switch 120 in one embodiment of the present disclosure, but the present disclosure is not limited thereto.

The high-voltage interlock switch 130 is connected to the automatic cut-off switch 120, and when a voltage that is a preset voltage or more is applied from the electric battery 21 through the automatic cut-off switch 120, the high-voltage interlock switch 130 operates to control the relay switch 40 to be turned off through a high switch.

The active voltage switch 140 operates at a voltage of 12 V for an electrical device, which is transmitted through the automatic cut-off switch 120, to control the relay switch 40 through the high switch. A switch in which a setting of a driving voltage value of the high-voltage interlock switch 130 is changed may be used as the active voltage switch 140 in the present embodiment.

When the voltage sensor 110 detects an output of a high voltage from the battery cell 20, the controller 150 provides a cut-off control signal to the relay switch 40.

According to one embodiment of the present disclosure, when an overvoltage is output from the battery cell 20, there is an effect of being able to directly control the relay switch 40 to block the overvoltage.

In addition, in one embodiment of the present disclosure, the relay switch 40 is not directly controllable through the controller 150, the active voltage switch 140 may be driven using the voltage applied through the electric battery 21, and the automatic cut-off switch 120 may be controlled to turn the relay switch 40 off through the active voltage switch 140 which is driven.

According to one embodiment of the present disclosure, even when the relay switch 40 is not controllable by the controller 150 of a battery management system (BMS), there is an effect of being able to control the relay switch 40 without using the high-voltage interlock switch 130, which requires a voltage that is a threshold value or more, thereby blocking application of a high voltage.

The above effects of the present disclosure can solve a problem in that, when an existing method of controlling the relay switch 40 is employed using the high-voltage interlock switch 130 in a state in which the controller 150 is usable, a non-ideal result is caused due to an overvoltage because the high-voltage interlock switch 130 is operated at a certain voltage or higher.

In addition, according to the present disclosure, since it is difficult to expect a certain voltage or more to be applied to the BMS, especially during an external short circuit, there is an effect of being able to switch the active voltage switch 140 using an input voltage (12 V) applied from the electric battery 21 and thus turn the relay switch 40 off, which is connected to an electrical device, thereby electrically deactivating the output stage of the battery cell 20.

In addition, when the controller 150 confirms that, even in a state in which the relay switch 40 is controlled to be turned off, a voltage of the output stage of the battery cell 20 is activated through the voltage sensor 110, the controller 150 switches the automatic cut-off switch 120 to be turned off to cut off the power applied from the electric battery 21 to an inside of the BMS so that there is an effect of being able to prevent a closed circuit from being formed in the BMS and control the output stage of the battery cell 20 to be electrically deactivated.

That is, in an existing battery system, when the BMS detects a voltage with the battery cells 20 (fuse) interposed therebetween, it is a common phenomenon that the battery cells 20 are short-circuited during an external short circuit. However, occasionally, the relay switch 40 is fused or an internal circuit of the BMS is damaged due to a high external current, and thus a closed circuit may be formed in the BMS due to a non-ideal phenomenon.

As described above, when the closed circuit is formed inside the BMS, the output stage of the battery cell 20 may be electrically activated. However, in the one embodiment of the present disclosure, in order to prevent the closed circuit from being formed inside the BMS, a 12 V power supply is cut off in advance so that there is an effect of being able to prevent the closed circuit from being formed inside the BMS, thereby blocking the output stage of the battery cell 20 from being electrically activated.

Figure 4:
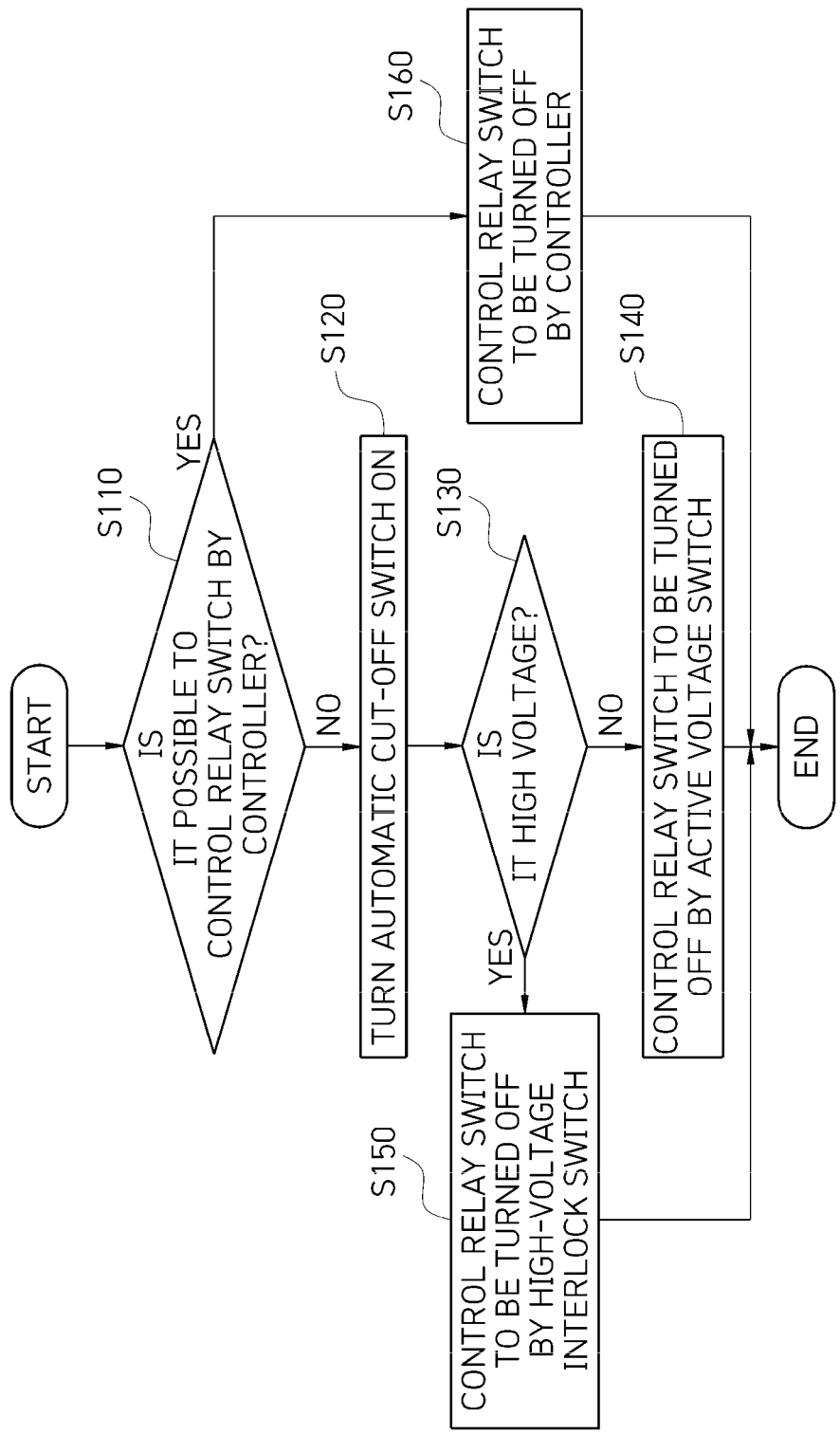
FIG. 4 is a flowchart for describing a control method of a battery system with a function of preventing an abnormal voltage at an output stage according to one embodiment of the present disclosure.

A control method of a battery system with a function of preventing an abnormal voltage at an output stage according to another embodiment of the present disclosure will be described with reference to FIG. 4.

When application of a voltage that is a preset value or more from the battery cell 20 is detected by the voltage sensor 110, the controller 150 of the BMS determines whether the relay switch 40 is controllable (S110).

When the relay switch 40 is not controllable in the determination operation (NO of S110), the controller 150 switches the automatic cut-off switch 120 to be turned on to allow the voltage applied from the battery cell 20 to be applied to the active voltage switch 140 and the high-voltage interlock switch 130 (S120).

Then, when the voltage applied from the battery cell 20 is a preset voltage or less (NO of S130), the active voltage switch 140, which is driven by a voltage applied from the electric battery 21 through the automatic cut-off switch 120, is driven to control the relay switch 40 to be turned off (S140).

According to one embodiment of the present disclosure, since it is difficult to expect an effect above a certain cell voltage when an external short circuit occurs, the following device is used to turn the relay switch 40 off. When an input voltage (12V) is applied from the electric battery 21, the automatic cut-off switch 120 is operated to control HIGH S/W through the active voltage switch 140. Consequently, the relay switch 40 that is present outside the BMS may be turned off to electrically deactivate the output stage of the battery cell 20.

Otherwise, when the output voltage of the battery cell 20 exceeds the preset voltage (YES of S130), the high-voltage interlock switch 130, which is operated only above a preset voltage, is operated to control the relay switch 40 to be turned off through the high switch (S150).

On the other hand, when the relay switch 40 is controllable through the controller 150 in the determination operation (YES of S110), the controller 150 directly controls the relay switch 40 to be turned off (S160).

As described above, according to one embodiment of the present disclosure, a connection between the relay switch 40 and the battery cell 20 may be blocked by controlling the relay switch 40 according to an applied voltage in addition to whether the relay switch 40 is controllable through the controller of the BMS, and thus there is an effect of being able to electrically deactivate the output stage of the battery cell 20.

FIG. 5 is a flowchart for describing a control method of a battery system with a function of preventing an abnormal voltage at an output stage according to another embodiment of the present disclosure.

Hereinafter, the control method of a battery system with a function of preventing an abnormal voltage at an output stage according to another embodiment of the present disclosure will be described with reference to FIG. 5.

A controller 150 in a BMS 100 determines whether a voltage that is a preset value or more is applied from a battery cell 20 using a voltage sensor 110 (S210).

In the determination operation (S210), when the voltage that is the preset value or more is detected through the voltage sensor 110 (YES), a control signal is provided to an externally provided relay switch 40 to prevent the voltage from being applied from the battery cell 20 (S220). Consequently, the voltage applied from the battery cell 20 is cut off without being applied to an electrical device 50.

Thereafter, in a state of controlling a connection to the battery cell 20 to be blocked, whether the voltage is applied from the battery cell 20 is detected through the voltage sensor 110 (S230).

When it is detected through the voltage sensor 110 that the voltage is applied from the battery cell 20 in the state of controlling a connection to the battery cell 20 to be blocked (YES of S230), in order to cut off the voltage that is applied from an electric battery 21 so as to drive the BMS 100, a control signal is provided to an automatic cut-off switch 120 provided inside the BMS 100 connected to the electric battery 21 to turn the automatic cut-off switch 120 off.

Thus, according to one embodiment of the present disclosure, the voltage applied from the electric battery 21 is cut off so as to not be applied to the BMS, there is an effect of being able to prevent a closed circuit from being formed inside the BMS.

As described above, when the closed circuit is formed inside the BMS and thus a voltage is formed at the output stage of the battery cell 20, in the case of an existing battery system, the output stage of the battery cell 20 may be electrically activated even after the short circuit is formed. However, in one embodiment of the present disclosure, in order to prevent the closed circuit from being formed inside the BMS, the 12V power applied from the electric battery 21 is cut off in advance so that there is an effect of being able to prevent the output stage of the battery cell 20 from being electrically activated.

For reference, the components according to the embodiments of the present disclosure may be implemented in the form of software or hardware such as a field programmable gate array (FPGA) or an application specific integrated circuit (ASIC) and may perform predetermined roles.

However, the "components" are not limited to software or hardware, and each component may be formed to be stored in an addressable storage medium or to reproduce one or more processors.

Thus, as an example, the components include components such as software components, object-oriented software components, class components, and task components, and processes, functions, attributes, procedures, sub-routines, segments of a program code, drivers, firmware, microcode, circuits, data, databases, data structures, tables, arrays, and variables.

The components and functions provided within the components may be combined into a smaller number of components or may be further divided into additional components.

In this case, it will be understood that each block of flowchart diagrams and combinations of the flowchart diagrams may be performed by computer program instructions. These computer program instructions may be embodied in a processor of a general purpose computer, a special purpose computer, or other programmable data processing equipment such that the instructions executed by the processor of the computer or other programmable data processing equipment generate parts for performing functions described in flowchart block(s). These computer program instructions may use a computer or other programmable data processing equipment for implementing a function in a specific manner or may be stored in a computer readable memory, and thus the instructions which use the computer or are stored in the computer readable memory can produce a manufacturing article including instruction parts for performing the functions described in the flowchart block(s). Since the computer program instructions can also be installed in the computer or other programmable data processing equipment, instructions, for performing a series of operations on the computer or other programmable data processing equipment to generate a computer-executed process, thereby operating the computer or other programmable data processing equipment, can provide operations for performing the functions described in the flowchart block(s).

In addition, each block may represent a module, segment, or a portion of code, which includes one or more executable instructions for executing specified logical function(s). It should also be noted that, in some alternative embodiments, it is also possible for the functions mentioned in the blocks to occur out of order. For example, two blocks shown in succession can be substantially performed simultaneously or, in some cases, the two blocks can be performed in the reverse order according to corresponding functions.

In this case, the term "~part" used in the embodiments refers to software or hardware components such as a FPGA or an application specific integrated circuit (ASIC) and performs predetermined roles. However, the term "~part" is not a meaning limited to software or hardware. The "~part" may be formed to be stored in an addressable storage medium or to reproduce one or more processors. Thus, as an example, the "~part" includes components such as software components, object-oriented software components, class components, and task components, and processes, functions, attributes, procedures, sub-routines, segments of program code, drivers, firmware, microcode, circuits, data, databases, data structures, tables, arrays, and variables. The functions provided in the components and "~parts" can be combined into a smaller number of components and "~parts" or can be further divided into additional components and "~parts." In addition, the components and the "~parts" can be implemented to reproduce one or more CPUs in a device or a secure multimedia card.

In accordance with the present disclosure, when a short circuit occurs in a battery cell of a battery system, the battery cell in an incomplete state is primarily blocked through a high voltage fuse, and even when a relay switch is fused and thus a voltage of the battery cell is activated, there is an effect that is capable of being able to provide electrical deactivation of the battery cell.

In addition, in accordance with the present disclosure, even when an unexpected closed circuit is formed according to an increase in function of a battery management system (BMS), there is an effect of being able to deactivate a voltage of an output stage of the BMS.

Each step included in the learning method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although the configuration of the present disclosure has been described in detail with reference to the accompanying drawings, this is merely an example and modifications and alternations within the scope of the technical spirit of the present disclosure can be devised by those skilled in the art to which the present disclosure pertains. Therefore, the protection scope of the present disclosure should not be limited to the above-described embodiments and should be defined by the description of the appended claims.

What is claimed is:

1. A battery system for preventing an abnormal voltage at an output stage, the battery system comprising a battery management system (BMS) which includes:
    a plurality of voltage sensors configured to detect first voltages of a plurality of battery cells, respectively;
    a relay switch configured to apply the first voltages to an electrical device according to a first control signal from the BMS;
    an automatic cut-off switch configured to cut off power applied from the plurality of battery cells according to a second control signal from the BMS;
    a high-voltage interlock switch connected to the automatic cut-off switch and configured to operate at a second voltage that is a preset voltage or more;
    an active voltage switch configured to operate at a third voltage transmitted through the automatic shut-off switch to control the relay switch; and
    a controller configured to, in response to detecting a voltage, which is higher than a threshold voltage, among the first voltages by the voltage sensor, provide a cut-off control signal to the relay switch.

2. The battery system of claim 1, wherein, when the relay switch does not perform cutting off in response to receiving the cut-off control signal from the controller, the controller is configured to output a third control signal to the automatic cut-off switch to turn the relay switch off through the active voltage switch.

3. The battery system of claim 1, wherein, when the third control signal is output to turn the relay switch off and activation of the output stage of the plurality of battery cells is detected through the voltage sensor, the controller is configured to provide a fourth control signal to the automatic cut-off switch so as to turn the automatic cut-off switch off.

4. A method of controlling a battery system for preventing an abnormal voltage at an output stage, the method comprising:
    determining whether a voltage, which is a preset voltage or more, is applied from a battery cell;
    upon determining that the voltage applied from the battery cell is the preset voltage or more, determining, by a controller of a battery management system (BMS), whether a relay switch is controllable;
    upon determining that the relay switch is not controllable, switching, by the controller, an automatic cut-off switch to be turned on to allow the voltage applied from the battery cell to be applied to an active voltage switch and a high-voltage interlock switch; and
    upon determining that the voltage applied from the battery cell is less than the preset voltage, controlling the active voltage switch to turn off the relay switch.

5. The method of claim 4, further comprising, upon determining that the voltage applied from the battery cell exceeds the preset voltage, operating the high-voltage interlock switch that operates only at the preset voltage or more to control the relay switch to be turned off.

6. The method of claim 4, further comprising, upon determining that the relay switch is controllable through the controller, directly controlling, by the controller, the relay switch to be turned off.

7. A method of controlling a battery system for preventing an abnormal voltage at an output stage, the method comprising:
    detecting, by a controller in a battery system, whether a voltage, which is a preset value or more, is applied from a battery cell through a voltage sensor;
    in response to a detection that the voltage is the preset voltage value or more, providing, by the controller, a first control signal to a relay switch, which is connected externally to the battery system, to block a connection between the relay switch and the battery cell such that the voltage from the battery cell is cut off;
    in a state in which the connection between the relay switch and the battery cell is blocked according to the first control signal, detecting whether the voltage is applied from the battery cell through the voltage sensor; and
    in response to a detection that the voltage is applied from the battery cell, outputting a second control signal for blocking a connection to an automatic cut-off switch of a battery management system (BMS) that is connected to an electric battery so as to cut off a voltage applied from the electric battery.

* * * * *